US009838439B2

(12) United States Patent
Combellas et al.

(10) Patent No.: US 9,838,439 B2
(45) Date of Patent: Dec. 5, 2017

(54) TELEPHONE NUMBER SIMPLIFICATION FOR VOIP NETWORKS

(71) Applicant: Level 3 Communications, LLC, Broomfield, CO (US)

(72) Inventors: Claudia M. Combellas, Centennial, CO (US); Katrina D. Hall, Littleton, CO (US); Dana A. Johnston, Littleton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 18 days.

(21) Appl. No.: 14/931,444

(22) Filed: Nov. 3, 2015

(65) Prior Publication Data
US 2017/0070540 A1 Mar. 9, 2017

Related U.S. Application Data

(60) Provisional application No. 62/214,574, filed on Sep. 4, 2015.

(51) Int. Cl.
*H04L 12/66* (2006.01)
*H04L 29/06* (2006.01)
(Continued)

(52) U.S. Cl.
CPC .......... *H04L 65/1066* (2013.01); *H04L 45/00* (2013.01); *H04L 65/103* (2013.01);
(Continued)

(58) Field of Classification Search
CPC ....... H04Q 2213/13097; H04Q 3/0087; H04Q 2213/13091; H04M 3/5175;
(Continued)

(56) References Cited

U.S. PATENT DOCUMENTS

| 8,660,113 B1 * | 2/2014 | Canavan ................. H04L 45/74 370/352 |
| 2008/0279354 A1 * | 11/2008 | Terpstra ............ H04M 3/42306 379/114.24 |

(Continued)

FOREIGN PATENT DOCUMENTS

EP  1590926 B1  8/2014

OTHER PUBLICATIONS

International Search Report dated Oct. 6, 2016, Int'l Appl. No. PCT/US16/043404, Int'l Filing Date Jul. 21, 2016, 3 pgs.

(Continued)

*Primary Examiner* — Charles C Jiang
*Assistant Examiner* — Will Lin

(57) ABSTRACT

A telecommunications network includes a network service computing device and a host routing device. The host routing device includes a switch. The host routing device is coupled with a remote network and a PSTN. The remote network is coupled to a plurality of communication devices. The network service computing device is in communication with a database. The database includes a plurality of tags associated with VoIP lines. The tags identify the physical location where a plurality of VoIP lines are being operated. The tags determine routing and billing of calls made from each of the VoIP lines. Using a tag as a main routing identifier, instead of just an actual phone number, increases the probability that calls made from the VoIP line are properly routed and correctly billed through the telecommunications network.

11 Claims, 7 Drawing Sheets

(51) Int. Cl.
  *H04L 29/08* (2006.01)
  *H04L 12/701* (2013.01)
  *H04M 15/00* (2006.01)

(52) U.S. Cl.
  CPC .......... *H04L 65/1069* (2013.01); *H04L 67/18* (2013.01); *H04M 15/56* (2013.01)

(58) Field of Classification Search
  CPC .... H04M 7/0075; H04M 15/00; H04M 15/56; H04M 15/8044; H04M 2215/202; H04M 15/08; H04W 40/02; H04W 40/00; H04W 4/021
  USPC ..... 379/114.28, 127.01; 455/406, 445, 456.1
  See application file for complete search history.

(56) References Cited

U.S. PATENT DOCUMENTS

| | | | |
|---|---|---|---|
| 2009/0089070 A1* | 4/2009 | Engel | G06Q 50/265 705/342 |
| 2010/0166154 A1* | 7/2010 | Peters | H04M 3/5116 379/45 |
| 2011/0177829 A1* | 7/2011 | Platt | G06Q 10/107 455/456.2 |
| 2013/0070757 A1 | 3/2013 | Elliott et al. | |

OTHER PUBLICATIONS

Written Opinion of the International Searching Authority dated Oct. 6, 2016, Int'l Appl. No. PCT/US16/043404, Int'l Filing Date Jul. 21, 2016, 6 pgs.

\* cited by examiner

200

| VoIP Line 204 | TN 206 | TAG 208 | Geo-Location 210 | Billing # 212 |
|---|---|---|---|---|
| VoIP Line 1 | 212-222-2222 | TAG A | Denver, CO | Billing Number #10 |
| VoIP Line 2 | 303-111-1111 | TAG A | Denver, CO | Billing Number #10 |
| VoIP Line 3 | 212-222-2277 | TAG B | Dallas, TX | Billing Number #105 |
| VoIP Line 4 | 303-111-3355 | TAG C | Manhattan, NY | Billing Number #115 |

202

TELEPHONE NUMBER SIMPLIFICATION FOR VOIP NETWORKS

RELATED APPLICATIONS

This application claims priority under 35 U.S.C. §119 from U.S. provisional application no. 62/214,574 entitled "TELEPHONE NUMBER SIMPLIFICATION FOR VOIP NETWORKS," filed on Sep. 4, 2015.

TECHNICAL FIELD

Aspects of the present disclosure generally relate to communication networks; and more particularly, to systems and methods for routing voice over Internet protocol (VoIP) network calls to and from a communication device using one or more network routing devices.

BACKGROUND

Modern phone lines are being upgraded from analog circuits in increasing numbers to voice over Internet protocol (VoIP). VoIP is a technology that allows a caller to make voice calls using a broadband Internet connection instead of a conventional (or analog) phone line. VoIP services convert voice audio into digital signals that travel over a network, which may often include segments considered part of the Internet. When calling a regular phone number from a VoIP number, the signal is converted to a regular telephone signal before it reaches the destination. VoIP calls can be made directly from a computer, a special VoIP phone, or a traditional phone connected to an adapter. In addition, wireless "hot spots" in locations such as airports, parks, and cafes with connection to the Internet may enable use of VoIP service wirelessly.

With its portability, cost savings, and the promise of enhanced functionality, VoIP telephony is becoming the de facto choice in many applications. VoIP has a range of advantages. It is a flexible communication system. For example, an end user assigned a VoIP line associated with a New York telephone number can move to a different state, e.g., Colorado, and still receive calls to the same New York telephone number associated with the VoIP line despite the end user physically relocating to Colorado. As such, the VoIP telephone number can travel with the end user such that the end user can be accessible via a single VoIP telephone number at multiple locations.

However, the virtual nature and portability of VoIP can cause various issues in the context of call routing, billing, and regulations compliance. Specifically, conventional systems route VoIP calls through telecommunication networks based upon the VoIP telephone number itself, i.e., the ten digit phone number (in the United States) and as such are ill equipped to route and process VoIP calls when end users operate VoIP lines outside of the geographical areas associated with the respective VoIP telephone numbers.

Accordingly, a need exists for improved routing devices and systems to address the portability of VoIP, among other improvements. It is with these observations in mind, among others, that various aspects of the present disclosure were conceived and developed.

SUMMARY

A need exists for improved telecommunication systems that facilitate efficient call routing in VoIP networks. Implementations described and claimed herein address the foregoing problems, among others, by providing systems, methods, and devices for assigning a plurality of tags or the like to the VoIP calls, with the tags including valid geographic information about the caller and recipient of the VoIP calls for purposes of improved call routing in a telecommunications network. Accordingly, one implementation of the present disclosure may take the form of a method of call routing for Voice over Internet Protocol (VoIP) calls, comprising utilizing a network service computing device comprising at least one memory for storing instructions that are executed by at least one processor to perform the operations of: receiving a first location associated with a first VoIP line, the first VoIP line including a telephone number associated with the first VoIP line; creating a first tag associated with the first location, the first tag including geographical information associated with the first location to facilitate routing functionality for calls made from the first VoIP by the geographic information instead of routing calls from the first VoIP line by the telephone number; receiving a request to facilitate a VoIP call between the first VoIP line and a second VoIP line; and routing the VoIP call using the first tag by a host routing device coupled to the network service computing device.

Yet another implementation of the present disclosure may take the form of a telecommunications routing system for routing VoIP calls over a host network. The telecommunications system comprises a host routing device. The telecommunications system further comprises a network service computing device coupled to the host routing device, the network service computing device comprising at least one memory for storing instructions that are executed by at least on processor to: receive a first location associated with a first VoIP line; create a first tag for the first VoIP line based upon the first location; wherein calls are routed from the first VoIP line based on the first tag.

Yet another implementation of the present disclosure may take the form of a method of call routing for Voice over Internet Protocol (VoIP) calls, comprising: utilizing a network service computing device comprising at least one memory for storing instructions that are executed by at least one processor to perform the operations of: receiving a first location associated with a first VoIP line; and generating a first tag associated with the first location to specify routing functionality for calls made from the first VoIP line.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
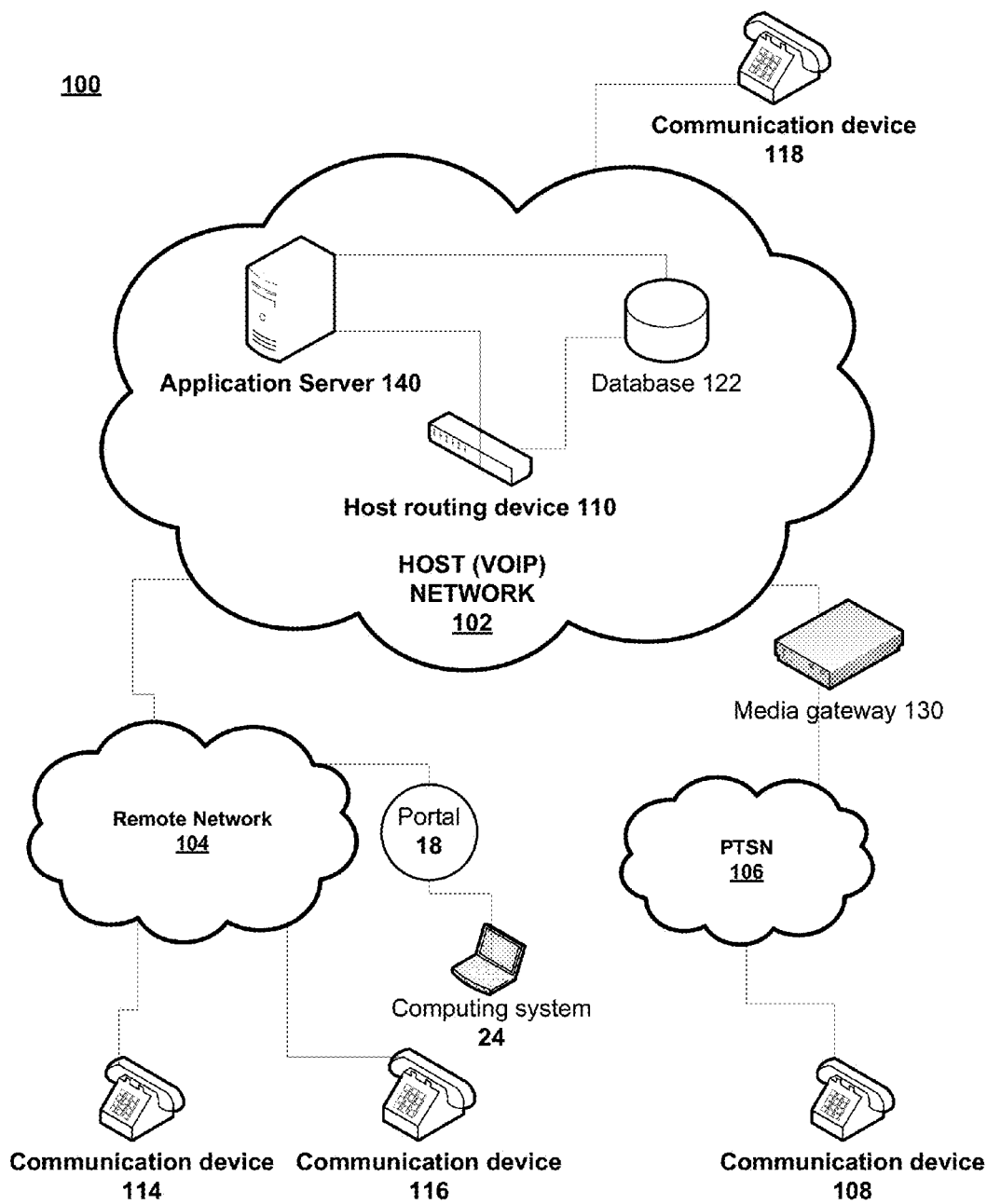
FIG. 1 illustrates an exemplary system view of a telecommunications routing system, according to aspects of the present disclosure.

Aspects of the present disclosure include systems, methods, and devices for assigning a plurality of tags or the like to the VoIP calls, with the tags including valid geographic information about the caller and recipient of the VoIP calls for purposes of improved call routing in a telecommunications network using at least one host routing device in a VoIP network. The host routing device is coupled with a remote network and a public switched telecommunications network (PSTN). The host routing device may be coupled to an application server and at least one database which may include a plurality of tags associated with VoIP lines. The tags identify the physical location of a VoIP device and user utilizing a given VoIP line and are used to determine routing and billing of calls from the VoIP line. Using a tag as a main routing identifier, to enhance or possibly replace an actual phone number, enhances the ability to properly route and correctly bill calls made from the VoIP lines when a call is being initiated from a different jurisdiction than the number is otherwise associated.

A telecommunications network may include one or more national networks formed from or otherwise using one or more public and/or private networks over which calls traverse between a source (the device from which a caller initiates a call) and a destination (the device being called and associated with a recipient). The telecommunications network allows end users to communicate by establishing temporary communication pathways across the network. In a telecommunications network, a public switched telecommunications network (PSTN) is a collection of fixed interconnected circuit-switched networks. In the United States, the PSTN has approximately 150 local access and transport area (LATA) networks, interconnected by networks that are known as interexchange carrier (IC) or long-distance networks. Trunks and trunk groups interconnect LATA and IC networks. Further, private networks interact with the PSTN in order to access the networks within the PSTN.

In order to initiate a call between a source and a destination (e.g., a caller and a recipient), a communication pathway, trunk, and/or circuit must be temporarily established between the end points of the call. Conventional telecommunication networks route calls using the actual phone number of the caller, namely, the phone number derived from the North American Numbering Plan (NANP). Under the NANP, a U.S. telephone number consist of ten digits: a three-digit area code, followed by a seven digit number. The seven digit number generally includes an exchange code identifying a telecommunications exchange within a numbering area, followed by a line number. The leading three digit number, commonly referred to as the "area code," defines a state or portion of a state or a numbering plan area (NPA). Importantly, the territory of an NPA is not identical to the service area of a LATA. Thus, depending on the actual phone number associated with the caller, the communication circuit may involve routing the call from the caller to the recipient across one or more exchanges and LATA boundaries, even if the caller and recipient are located in the same state.

A conventional telephone, sometimes colloquially referred to as a "land line," is confined to a specific physical location. Calls can be effectively routed from (and billed to) a conventional telephone based upon a NANP telephone number because the NANP telephone number includes information about and is specifically associated with the specific physical location of the caller. Put simply, with analog phones, conventional systems can easily identify where the caller is located for purposes of routing and billing the call.

In contrast, VoIP lines are not confined to specific physical locations. Users of a VoIP network can access and operate VoIP lines in multiple locations while still maintaining the same telephone numbers assigned to the VoIP lines. For example, a caller can initiate calls from a VoIP line, associated with a New York NANP telephone number, despite the caller being located in Colorado. Such portability is highly beneficial to the caller and more and more users of VoIP networks wish to maintain the same NANP telephone number when moving to different locations.

However, the portability of VoIP generates complexities and various drawbacks. For example, with conventional telecommunication systems, calls sent from a first VoIP line assigned a New York telephone number, are routed and/or billed across the telecommunication network based upon the New York telephone number—even if such calls originate from Colorado, thereby creating routing inefficiencies, possible billing difficulties, and potential compliance difficulties. The example above can be further illustrated in the context of local Colorado calls made from the first VoIP line (assigned the New York telephone number). In one case, local Colorado calls made from the first VoIP line may be routed inefficiently, e.g., through New York, because the conventional network would be unable to recognize that the call should be a local call. Moreover, even if the calls were routed properly between the caller and recipient (via a local trunk), the calls would be designated as "long-distance" or "inter-LATA" calls and the calls may still be billed based upon the New York NANP telephone number (despite the network not having to establish a long-distance communication path between the caller and recipient). Accordingly, a need exists for improved routing of VoIP calls.

For a detailed description of an example telecommunications routing system 100 for improving the routing of VoIP calls, reference is made to FIG. 1. Specifically, FIG. 1 illustrates a telecommunication routing system 100 in accordance with various embodiments of the present disclosure. Telecommunication routing system 100 includes a host network 102, a remote network 104, and a public switched telephone network (PSTN) 106 connected to the host network 102 via a media gateway 130. A communications device 108, such as an analog phone, is communicably coupled with PSTN 106. PSTN is communicably coupled with host network 102, and host network 102 is communicably coupled with remote network 104. Remote network 104 is communicably coupled with communication devices 114, and 116. Host network 102 includes a host routing device 110, a database 122, and an application server 140. Database 122 may be communicably coupled to host routing device 110 and application server 140. Host network 102 is further communicably coupled with a communication device 118.

Host routing device 110 assists with the routing of calls in the VoIP network 102. Routing is facilitated by tags provided to host routing device 110 and the tags may be provided by an application server 140. Application server 140 may be a network service computing device and may include one or more servers, mainframes, mobile devices, laptop computers, tablets, video streaming devices, smart televisions, smartphones, web appliances, communication network nodes (e.g., network routers, switches, or bridges), or computing systems embedded within another device or system. Application server 140 assists host routing device 110 with the creation and maintenance of tags for various VoIP lines.

Remote network 104, which may include at least one remote switch, serves one or more communications devices, e.g., communication devices 114, 116. Communications device 114 may be associated with a first telephone number (TN1), and communications device 116 may be associated with a second telephone number (TN2), for example. When a call is made from communication devices 114 or 116 to an outside communications device, such as communications device 108 and/or communications device 118, the call passes through host routing device 110 of host network 102 and remote network 104 with host network 102 assisting with routing of the calls made from communication devices 114 or 116.

Figure 2:
FIG. 2 illustrates an exemplary portion of a database comprising a plurality of tags and associated information for improved routing of VoIP calls, according to aspects of the present disclosure.

Database 122 may be a location tag identifier database for storing a plurality of tags 208 corresponding to a plurality of VoIP phone lines 204. An exemplary portion 200 of data from database 122 is illustrated in FIG. 2. Portion 200 of database 122 includes a plurality of data files 202 with each file including a VoIP line 204, a telephone number (TN) 206, a tag 208, a geographic location geo-location 210 associated with the tag 208, and a billing number 212.

A tag 208 may be a unit of information used as a label or marker for the file 202. In some embodiments, a tag 208 is a string or set of characters comprising software code that identifies various conditions about data in a file 202 and may be located in, e.g., a header of the file 202. Tags 208 are assigned to VoIP lines 204 to specify routing and billing protocols for calls made from the VoIP lines 204. Tags 208 specify specific and updated geographical locations 210 associated with the VoIP lines 204 managed by host network 102. Tags 208 may further define a billing number 212 for a VoIP line 204. The telephone number (TN) 206 of each file 202 may be a standard NANP number.

Tags 208 may be specific to particular building numbers of a customer of host network 102. More particularly, a tag 208 may be associated with a specific building within a campus. Assigning tags 208 to particular buildings within a campus allows for better management of VoIP lines by grouping one or more VoIP lines to a building.

Geographic location 210 may include an exact street or postal address including a building number for the VoIP line 204. In some embodiments, geographic location 210 may include a master street address guide (MSAG) address. An MSAG address defines a very specific physical location. For example, a standard postal address may define a particular building or set of buildings. In contrast, an MSAG address defines a more specific location, e.g., a particular building in a campus.

In some embodiments of the present disclosure, when the owner of remote network 104 is setting up a plurality of VoIP lines for, e.g., communication devices 114 and 116, tags 208 can be assigned to each of the VoIP lines. As such, upon implementation of such VoIP lines at remote network 104, host routing device 110 is provided with valid geographical information about where the communication devices 114 and 116 are going to be utilizing one or more VoIP lines. For example, VoIP line 1 of FIG. 2 may be accessible via communication device 114 and may be assigned a New York phone number of "212-222-2222." In addition, VoIP line 1 may be assigned a tag, e.g., "TAG A," which specifies that VoIP Line 1, via communication device 114, is being operated and/or accessed out of Denver (and not New York), and that VoIP Line 1 is assigned "Billing Number #10." TAG A may be assigned to VoIP Line 1 upon the implementation (set-up or provisioning of VoIP lines to a remote network) of VoIP Line 1 at remote network 104. Alternatively, TAG A (and the associated geographical location 210 and billing number 212) may be assigned to VoIP Line 1 in database 122 after implementation of VoIP Line 1. In further embodiments, a user operating VoIP Line 1 may desire to move from Denver, Colo. to another location, such as Dallas, Tex. in the example here. Accordingly, TAG A of VoIP Line 1 may be replaced with another tag reflective of the change in location, e.g., TAG B, so that the host routing device 110 and the application server 140 can adjust routing functionality for calls made from VoIP line 1. Specifically, consistent with the instant example, when a caller moves to Dallas the caller can maintain the same VoIP line 1 by switching tags. Such flexibility is achievable because according to the present disclosure, telephone numbers 206 associated with a given VoIP line 204 may be ignored by the network for purposes of routing functionality with routing functionality instead defined by tags 208.

Billing numbers 212 assist the telecommunication routing system 100 with the proper billing procedures for calls made from VoIP lines 204 based upon the tags 208 and geographical information 210. In some embodiments, the tag 208 gets used, or is translated to the billing number 212 as calls are routed through the telecommunications routing system 100. Tags 208 determine whether calls are designated as local, or long distance. As such, the dialable TNs 206 become irrelevant with respect to routing and billing. Tags 208 and billing numbers 212 are compatible across various network elements and components such that tags 208 and billing numbers 212 may be seamlessly integrated within or accessible by all the network components, carriers, and networks, which need the information, of telecommunications routing system 100. Compatible, in some embodiments means that the tags 208 and billing numbers 212 can traverse with the data defining a call through numerous different networks without requiring additional software or systems to interpret tags or billing numbers. For example tags 208 and billing numbers 212 can be compatible with SIP and SS7 environments. In some embodiments, tags 208 are received by outside carriers of host network 102 as merely billing numbers 212. Tags 208 provide a flexible way to bill and route calls in a VoIP network without requiring modification of systems by outside carriers or network elements of telecommunications routing system 100. Namely, tags 208 facilitate accurate routing and billing of calls from VoIP callers in a VoIP network but do not require networks external to host network 102 to update software or systems in order for calls to be accurately routed to such external networks.

In some embodiments, the host routing device 110, ignores the TN, and assigns tags to govern the routing functionality for each VoIP line previously defined by the TNs 206, e.g., the functionality or routing parameters may be defined by the tags 208. Routing parameters define how calls made from VoIP lines are routed through a network.

Alternatively, such tag integration can be achieved alone or in combination with the application server 140. More specifically, in some embodiments, application server 140, using a software application such as a tag maintenance application 750, can maintain and manage a routing table in database 122 with a plurality of tags 208; the tags associated with one or more VoIP lines 204. As calls need to be routed through host network 102, the application server 140 may instruct or aide host routing device 110 by communicating how calls for particular VoIP lines should be routed. In one specific example, if a caller initiates a call which is received by host routing device 110, and the caller is using a VoIP line 204 associated with a particular tag 208, either the host routing device 110 or the application server 140 may receive or identify the tag 208 as the call is received at the host routing device 110, the application server 140 can query database 122 for information about the tag 208, and the call can be accurately routed to a network external to host network 102 based on information associated with the tag 208 (such as the geo-location 210 of the VoIP line).

In some embodiments, billing numbers 212 are attached to specific geographic locations 210 and may be assigned to specific customer locations or buildings. Billing numbers 212 assist with the computation of costs per call based on the geographic information 210 assigned to each of the VoIP lines 204. In some embodiments, tags 208 may be replaced with billing numbers 212 as calls are routed outside of the host network 102.

The creation of files 202 and associated file data, and the creation and maintenance of tags 208 can be implemented and processed by one or more processors of application server 140 with relevant data stored in database 122. The files and tag information may be made available to host routing device 110 to facilitate improved routing of VoIP calls. In other embodiments, a plurality of application servers 140 and a plurality of databases 122 may be utilized for the maintenance of tags 208. Further, database 122 may be external to host network 102 such that application server 140 communicates with database 122 remotely to store and access tags 208.

Figure 5:
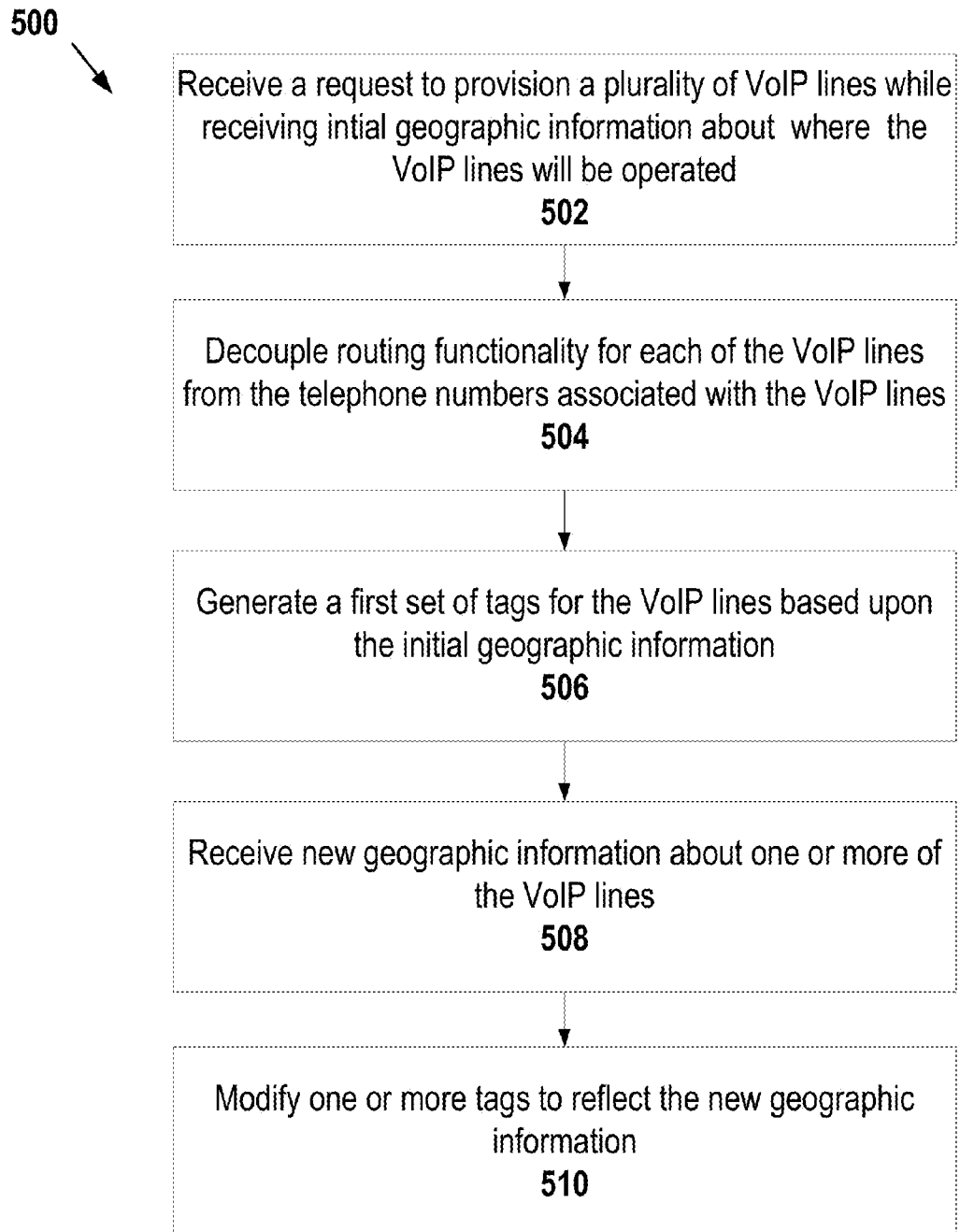
FIG. 5 illustrates an exemplary process flow for assigning and modifying tags to a plurality of VoIP lines in a VoIP network, according to aspects of the present disclosure.
Figure 6:
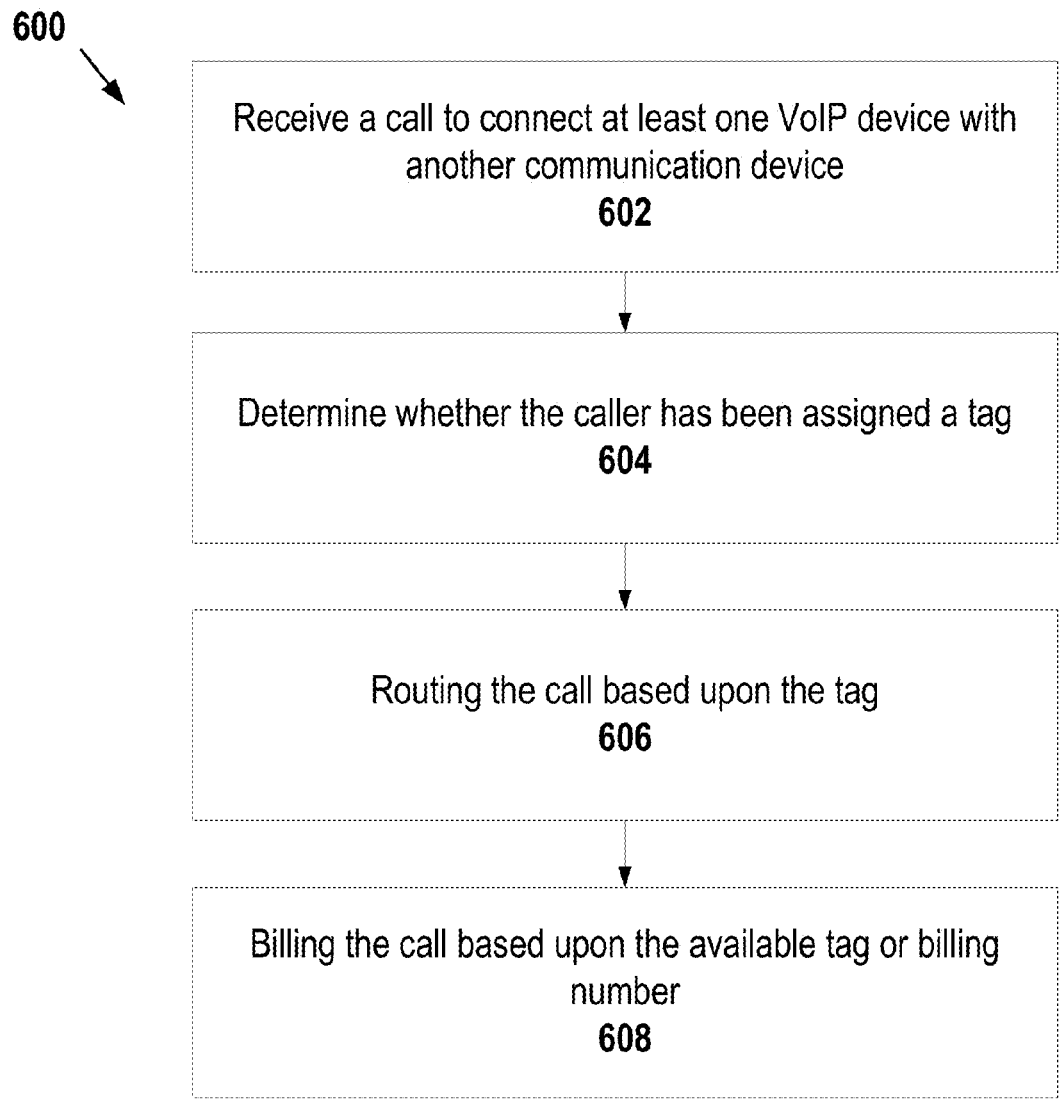
FIG. 6 illustrates an exemplary process flow for routing calls through a VoIP network using tags, according to aspects of the present disclosure.

As shown in FIGS. 2 and 5-6, using one or more software applications executed by application server 140, each of the telephone numbers associated with a plurality of VoIP lines can, for the purposes of routing, be ignored. In other words, the VoIP lines 204 maintain the telephone numbers 206 for each VoIP line from an end user perspective, but the tags 208 may replace the telephone numbers 206 for VoIP lines 204 with respect to routing functionality. As such, when host routing device 110 is requested to connect a call between communication device 116 and another communication device, host routing device 110 identifies the physical location of communication device 116, for routing and billing purposes, depending on tags 208, and does not merely apply information from the telephone number 206 assigned to communication device 116.

Figure 3:
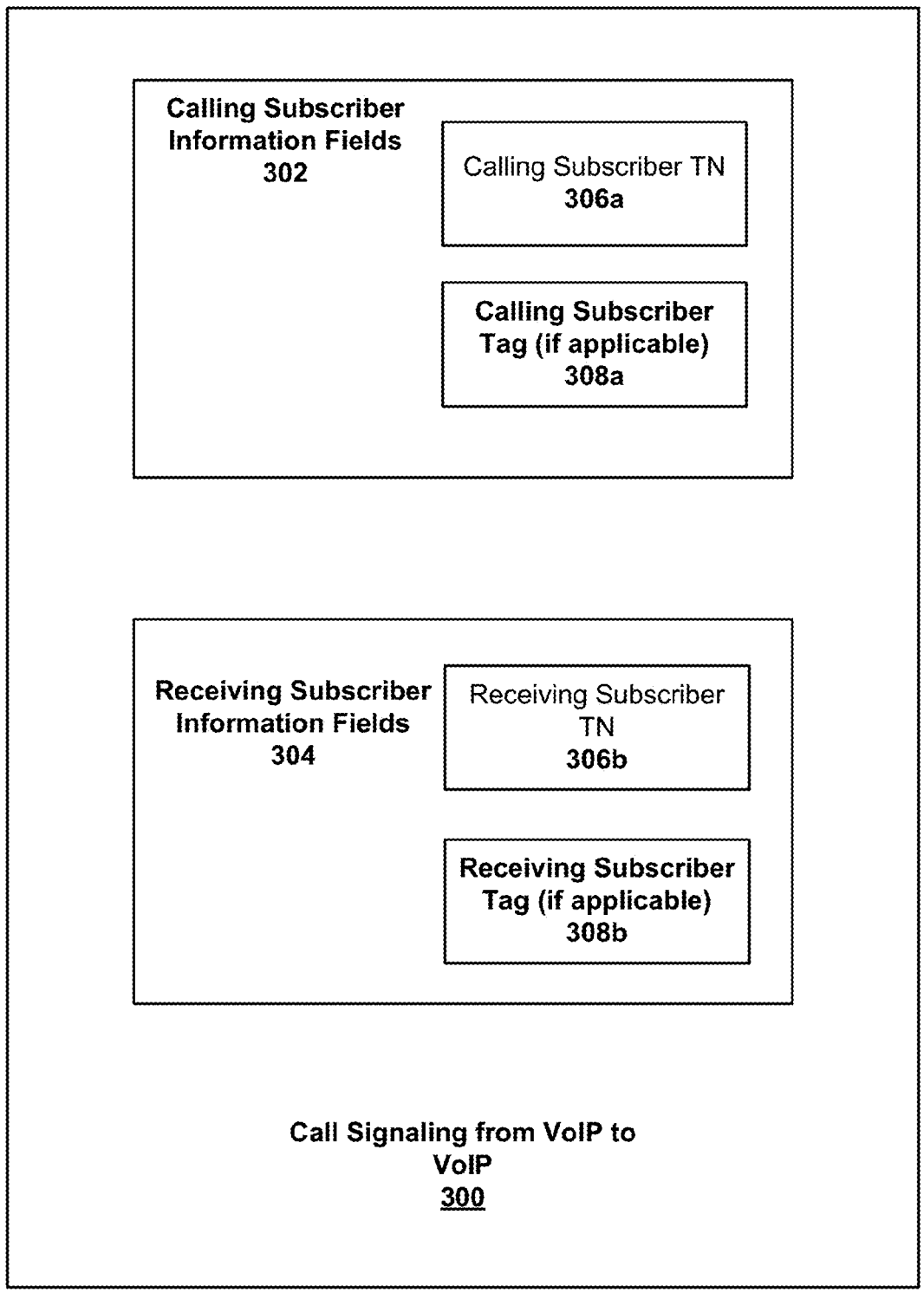
FIG. 3 illustrates exemplary signaling information for VoIP calls using the tags, according to aspects of the present disclosure.

Returning to FIG. 3, exemplary signaling information 300 is illustrated according to some embodiments of the present invention. FIG. 3 specifically demonstrates exemplary signaling information for when a caller of a first remote network such as remote network 104, initiates a call to a recipient of a different remote network and each of the caller and recipient VoIP lines have been assigned tags. In the present example, host network 102 and host routing device 110 manage traffic for the remote networks. The remote networks are both considered to be customers (and may be separate customers) of host network 102.

Although call signaling information 300 may often comprise more information than shown in FIG. 3, a first field, the caller information field 302, may be populated by the caller telephone number (TN) 306a and a caller tag 308a. A second field, the recipient information field 304, may be populated by the recipient TN 306b and the recipient tag 308b. Field 302, field 304, and their respective contents aide a receiving device, such as host routing device 110, in routing the call to the proper destination, or target, such as a remote switch of remote network 104.

While FIG. 3 depicts multiple users each having a tag of the present disclosure, in some embodiments, one or more of the caller or the recipient of the call may be a party outside of remote network 104 or host network 102 such as a user of communication device 108. Such external phone lines may still be routed based upon telephone numbers and will not have a tag 208. Thus, signaling information 300 passing through and managed by host routing device 110 may include one or more tags 208 or may include a single tag depending upon the parties to the particular call.

Signaling information 300 may be communicated between network signaling elements in a communications system, such as telecommunication routing system 100, via different methods, such as, for example, SS7, PRI, CAS, and SIP. SIP signaling is a unique VoIP signaling protocol and may be particularly useful for signaling by host network 102.

Figure 4:
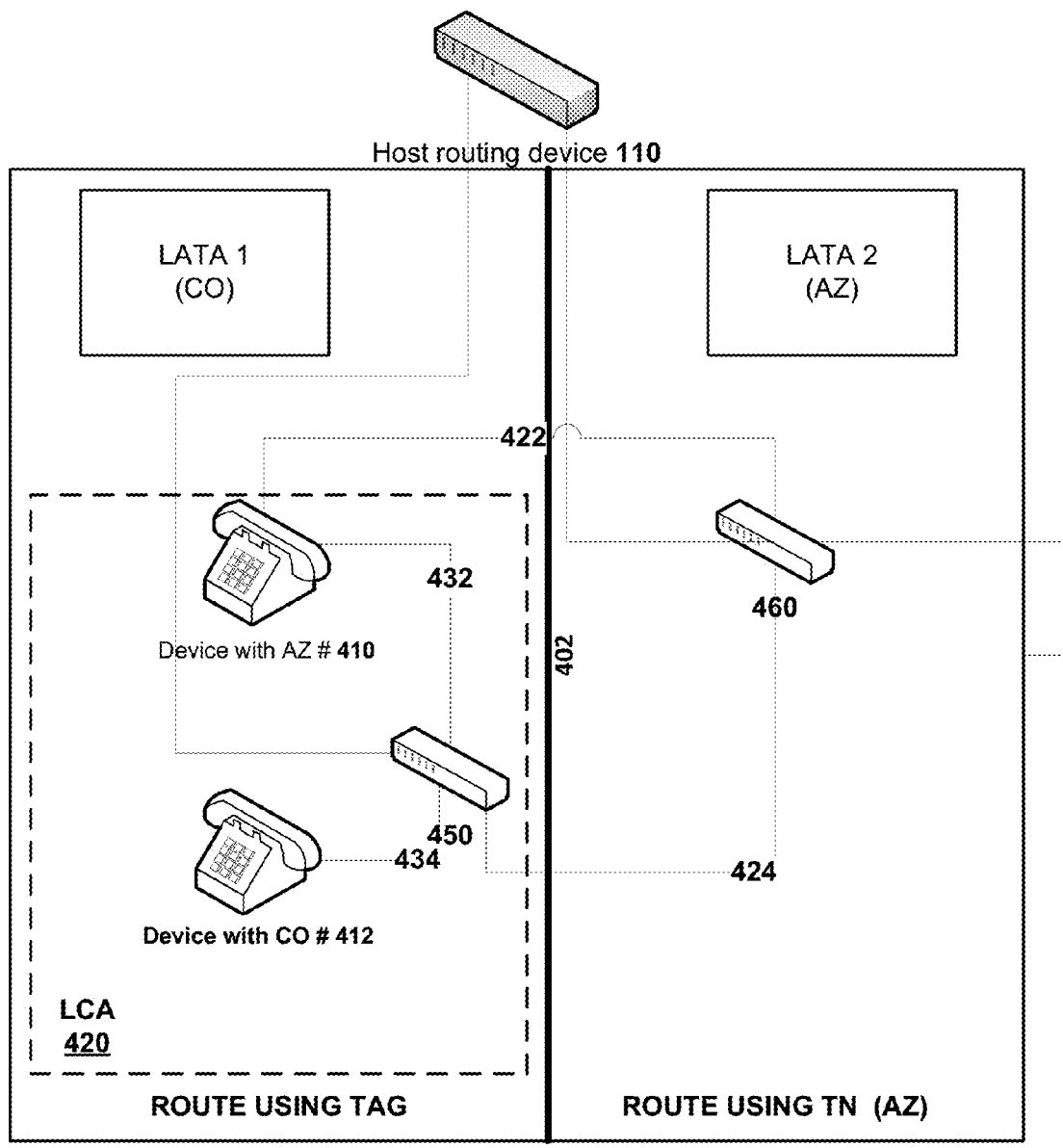
FIG. 4 illustrates routing functionality for VoIP calls using the tags, according to aspects of the present disclosure.

FIG. 4 illustrates the difference in routing when using tags 208 of the present disclosure as opposed to routing VoIP calls using traditional NANP telephone numbers. In FIG. 4, call routing is specifically demonstrated showing calls made near a boundary 402 between two LATAs, LATA 1, and LATA 2. In the example of FIG. 4, LATA 1 happens to be in Colorado, and LATA 2 happens to be in Arizona, but such geographic references are made merely as an example to illustrate the described concepts. Calls are routed using host routing device 110 and remote switches 450 and 460. For the example in FIG. 4, it should be assumed that calls crossing the boundary 402 are designated as long distance calls.

FIG. 4 further illustrates two separate VoIP communication devices 410 and 412, using separate respective VoIP lines. Communication device 410 is operating a VoIP line with an Arizona telephone number (TN). Communication device 412 is operating a VoIP line using a Colorado TN. Importantly, communication devices 410 and 412 are physically close to one another such that the devices share a common local calling area 420, i.e., calls between communication devices 410 and 412 should be "local" for billing purposes and a local trunk should be established between the communication devices when calls are made between the communication devices 410 and 412. At the same time, if calls are routed through boundary 402, the calls should be designated as long distance, or inter-LATA calls and long distance communication pathways should be established.

Without the tags 208 of the present disclosure, calls made from the communication devices 410 and 412 may be routed according to the TN number. As such, calls may pass through communication paths 422 and 424 which includes passing through boundary 402. In contrast, utilizing tags 208 of the present disclosure, calls made from communication devices 410 and 412 are properly routed through communication paths 432 and 434, within the local calling area 420. Tags 208 further facilitate such calls, being routed between communication devices 410 and 412 via local communication paths 432 and 434, to be billed as local calls.

FIG. 5 depicts an exemplary flow diagram 500 illustrating methods for assigning and modifying tags for VoIP lines. In block 502, an application server 104 of host network 102 receives a request to provision a plurality of VoIP lines for a remote network, such as remote network 104. The request may be received by, e.g., a portal 18. A portal 18 may comprise a web interface to allow users of VoIP lines to update geographic information for the VoIP lines. More specifically, a user can log onto a web page via a computing system 24 and access the portal 18. Portal 18 may further comprise at least one application program interface (API) that sits behind a web interface to provide additional functionality and features. In some embodiments, portal 18 is accessible to the user via a mobile or general software application downloaded or accessible on a computing system or communication device such as communication device 114. The computing systems 24 may include mobile phones (similar to communication devices 114 and 116), smartphones, servers, mainframes, laptop computers, tablets, smart televisions, or smartphones.

The request may specify that various physical locations be assigned to one or more of the VoIP lines. For example, referring to a VoIP line with a "212" area code, it may be requested from the remote network 104 that the VoIP line be associated with a geographic location in Denver, Colo. In some embodiments, a plurality of VoIP lines are designated with a particular building of a customer and associated with a particular geographic location of the customer. According to some embodiments of the present disclosure, a customer (remote network 104) obtains a block of VoIP lines associated with a block of TNs and allocates the TNs to its customers or users.

More specifically, according to some embodiments of the present disclosure, when a customer of host network 102, such as the owner of remote network 104, is set up according to the telecommunications routing system 100 illustrated in FIG. 1, the customer begins by acquiring a VoIP switch that may serve as a remote switch, such as a class 5 switch. Setting up a remote network 104 may include purchasing access to host network 102 and purchasing a plurality of VoIP lines in addition to the deployment of network components to allow remote network to function as a network for the VoIP lines and communicate with other networks such as host network 102. The customer, remote network 104, may acquire telephone numbers from the provider of host network 102. The host network 102 then provides access to computing systems of the host network 102 to allow the customer to provision against the host network 102 for utilizing host routing device 110 and/or other host switches. For each of the telephone numbers acquired by the customer, the customer designates an intended location where the telephone numbers will be used. Such information may be referred to as geographic information, locations, or the like.

In block 506, a first set of tags, such as tags 208, are created for and assigned to each of the VoIP lines based upon the requested geographic locations received from remote network 104. Tags 208 are associated with a geographic location 210 and a billing number 212. In some embodiments, tags 208 may populate the one or more routing parameters instead of using information from telephone numbers. Using tags 208, the telephone numbers associated with each of the VoIP lines are ignored with respect to routing functionality. In other words, routing functionality for each of the VoIP lines is no longer based on the telephone numbers associated with the VoIP lines. The telephone numbers may remain unchanged, but the routing functionality is improved by use of the tags which are retrofitted with up-to-date geographic information about where the VoIP lines are being operated. As such, tags 208 provide more accurate routing of VoIP calls while maintaining the status quo with respect to assignment of telephone numbers.

In block 508, host network 102 may receive a request from one or more communication devices associated with one or more VoIP lines to update geographic information associated with the one or more VoIP lines. A user of a VoIP line may decide to move to a different physical location but may also wish to maintain the same telephone number for the VoIP line.

In some embodiments, a user of a VoIP line can send the request to update geographic information associated with the VoIP line via a portal similar to portal 18. As discussed above, portal 18 may comprise a web interface to allow users of VoIP lines to update geographic information for the VoIP lines. More specifically, a user can log onto a web page via a computing system 24 and access the portal 18. Portal 18 may further comprise at least one application program interface (API) that sits behind a web interface to provide additional functionality and features. In some embodiments, portal 18 is accessible to the user via a mobile or general software application downloaded or accessible on a computing system or communication device such as communication device 114. The computing systems 24 may include mobile phones (as in the case of communication devices 114 and 116), smartphones, servers, mainframes, laptop computers, tablets, smart televisions, or smartphones.

As part of initiating a request to update geographic information, an end user can be prompted to provide a postal address. The postal address may be processed by a geographic information system (GIS) system of host network 102. GIS validates the postal address to ensure that the postal address is an actual recognizable address. As such, GIS ensures that valid geographic information is being received from the end user.

Finally, in block 510, when the new geographic information has been received and validated, the tags associated with the one or more VoIP lines can either be replaced or modified to reflect the new geographic information. Thus, telecommunications routing system 100 ensures that calls routed across host network 102 are routed using optimized routing parameters, e.g., updated geographic information as specified in the tags.

FIG. 6 depicts a flow diagram 600 illustrating methods for routing VoIP calls using a host routing device 110 and a plurality of tags, according to various embodiments of the present invention. Host routing device 110 utilizes tags 208 to determine proper routing protocols. In block 602, a call may be sent from a user of remote network 104 to, e.g., a user of PSTN 106 such as communication device 108. The call may be initiated by, for example, communication device 114.

In block 604, a determination is made whether the calling number has been assigned a tag 208, which may involve querying database 122 to determine proper call routing. In cases where a tag 208 is present, routing of the call from the communication device 114 to the communication device 108 may be based on the tag 208 and associated data such as geographic information 210. If a tag 208 is not present, then routing to a remote switch and to the communication device 108 may be based on the TN field 206 (also known as the calling party number field).

In some embodiments, where a tag 208 is assigned to the calling number, one or more of the host routing device 110 or application server 140 may identify the tag 208, and retrieve geographic location information 210 associated with the tag 208 as stored in database 122. Thereafter, the host routing device 110, using the geographic location information 210, can properly route the call to its intended destination. In some embodiments, the tag 208 is attached to a data stream associated with the call along with the billing number 212 and travels through external networks to a recipient. In some embodiments, the tag 208 does not travel with the call (data stream) once the host routing device 112 sends the call outside of host network 102 and is used by host routing device 110 merely to define routing functionality for calls made from host network 102.

In block 606, the call is routed based on a tag assigned to the VoIP line and associated with the communication device 114. Finally, the call from communication device 114 to communication device 108 is billed based upon the information provided by the tag 208. In some embodiments, the tag 208 gets used, or is translated to the billing number 212 as the call is routed through telecommunications routing system 100 from the communication device 114 to the communication device 108. Tag 208 determines whether the call from communication device 114 to communication device 108 is a local, or long distance call. As such, the dial-able TN 206 associated with the communication device 114 is ignored with respect to routing and billing. The tag 208 and billing number 212 are both compatible across various network elements and components such that tags 208 and billing numbers 212 are seamlessly integrated within telecommunications routing system 100. For example, tags 208 and billing numbers 212 can be compatible with SIP and SS7 environments. In some embodiments, the tag 208 of the present example is received by outside carriers of host network 102 as a billing number 212. The tag 208 provides a flexible way to bill and route calls from communication device 114 without requiring modification of systems by outside carriers of host network 102.

In some embodiments, host network 102 may be further communicably coupled with a Local Exchange Routing Guide, such as, for example Telcordia® LERG™ Routing Guide ("LERG") database (not shown), and with a Number Portability Administration Center ("NPAC") database (not shown). According to some embodiments of the present invention, a LERG database is a Telcordia® LERG™ Routing Guide, which may be produced and/or output by a Telcordia® Business Integrated Rating and Routing Database System (BIRRDS).

Host network 102 and remote network 104 may include any system capable of passing communications from one entity to another such as, e.g., the Internet, a virtual private network, a local area network, a wide area network, a Wi-Fi network, a PSTN, a cellular network, or any combination thereof. "Communicably coupled," as used herein, includes any means of coupling whereby information is passed, such as, e.g., electrically coupled by a wire, optical cable, or wirelessly coupled by a radio frequency or any such wireless media and may include both direct coupling and indirect coupling. Routing includes any action taken to transfer, initiate, terminate, end, and/or direct calls and/or data. Communication devices 114, 116, and 118 may be end user communication devices and may include IP-enabled telephones, cellular telephones, laptop computers, fax machines, or the like.

Remote network 104 may be a private network such as a customer network of host network 102. The communication and networking components of remote network 104 enable a user at the remote network 104 to communicate via the host network 102 with other communication devices, such as another user via communication device 108. In some embodiments, remote network 104 may connect to the host network 102 via a session border controller (SBC) device or Network Address Translation (NAT) device which in some embodiments may be included as part of host routing device 110. In general, an SBC is a device deployed within the host network 102 to control signaling involved in setting up and tearing down communications between an end user and the host network 102. In some embodiments, host routing device 110 may include a plurality of SBCs utilized in host network 102.

In some embodiments, host routing device 110 may be communicably coupled with application server 140. Application server 140 may, via a processor, execute one or more software applications and communicate with host routing device 110 to assist with tag generation, tag maintenance, and routing. Application server 140 may further be communicably coupled with database 122.

Communication device 106 accesses, and is accessed by the host network 102 via PSTN 106 and a local exchange carrier (LEC) (not shown). Communication via any of the networks may be wired, wireless, or any combination thereof. Additionally, the PSTN 106 may communicate with the host network 102 through a media gateway device 130.

According to some embodiments of the present invention, host network 102 is a VoIP network, and host routing device 110 is a network routing resource. Embodiments of the present disclosure permit remote network 104 to serve users by connecting to PSTN 106 and/or other networks through host network 102.

As a network routing resource, host routing device 110 may include any device capable of routing a call and/or data and can include one or more of a switch, a session border controller (SBC), a gateway, a gateway controller, a softswitch, a proxy server or a feature server. Host routing device 110 may further include, for example, a Class 5 softswitch, a Class 4 softswitch, or a hybrid Class 4/Class 5 softswitch, which has all or some of the properties and functions of a Class 4 softswitch and/or a Class 5 softswitch. In some embodiments, host routing device 110 comprises a bundle of networking components and includes one or more switches in addition to application server 140 and database 122.

In one embodiment, host routing device 110 includes a session border controller (SBC) and a gateway media device. In such an embodiment, one or more trunk connections may connect the SBC and a border media gateway device to host network 102. In general, a trunk is a transmission channel between two points, typically between two networks to carry communications between the networks. In an Internet Protocol (IP) environment, the trunks provide the IP interconnect between an SBC and the host network 102. To facilitate interconnect, one or more IP addresses are shared between the SBC and host network 102. The IP addresses allow for the communications transmitted between the SBC and host network 102 to be addressed and sent to the correct network device. In addition, several trunks may be connected to the SBC such that the SBC may receive communication from several customers to the host network 102. One or more of the application server 140, host routing device 110, and SBC may provide telecommunication services to and from communication devices 114, 116, and 106. For example, in one embodiment, application server 140 can assist with calls and services to a proper end user through a trunk group connection and an SBC.

Remote network 104 may include a private branch exchange (PBX), an IP-PBX, IP-phones, and an SBC. Remote network 104 may include a remote switch, for example, a Class 5 switch. The Class 5 switch may be, for example, a Class 5 softswitch which is capable of converting a network signaling format to a media gateway and call session control format. A Class 5 softswitch can utilize the signaling to establish and teardown user calls and invoke call features on existing calls, to provide various end-user services. A Class 5 softswitch may further provide for call accounting intelligence for a host network. A Class 4 softswitch, on the other hand, may in some embodiments perform higher-level switching and routing tasks while not necessarily performing the same call features that a Class 5 softswitch performs, such as, for example, caller ID. Class 4 softswitches are often situated closer to the center of the network and configured to handle VoIP calls in a fashion similar to that of tandem office switches in circuitswitched networks. A hybrid Class 4/Class 5 softswitch includes some or all of the properties and functions of a Class 4 softswitch and/or a Class 5 softswitch, according to embodiments of the present disclosure.

Figure 7:
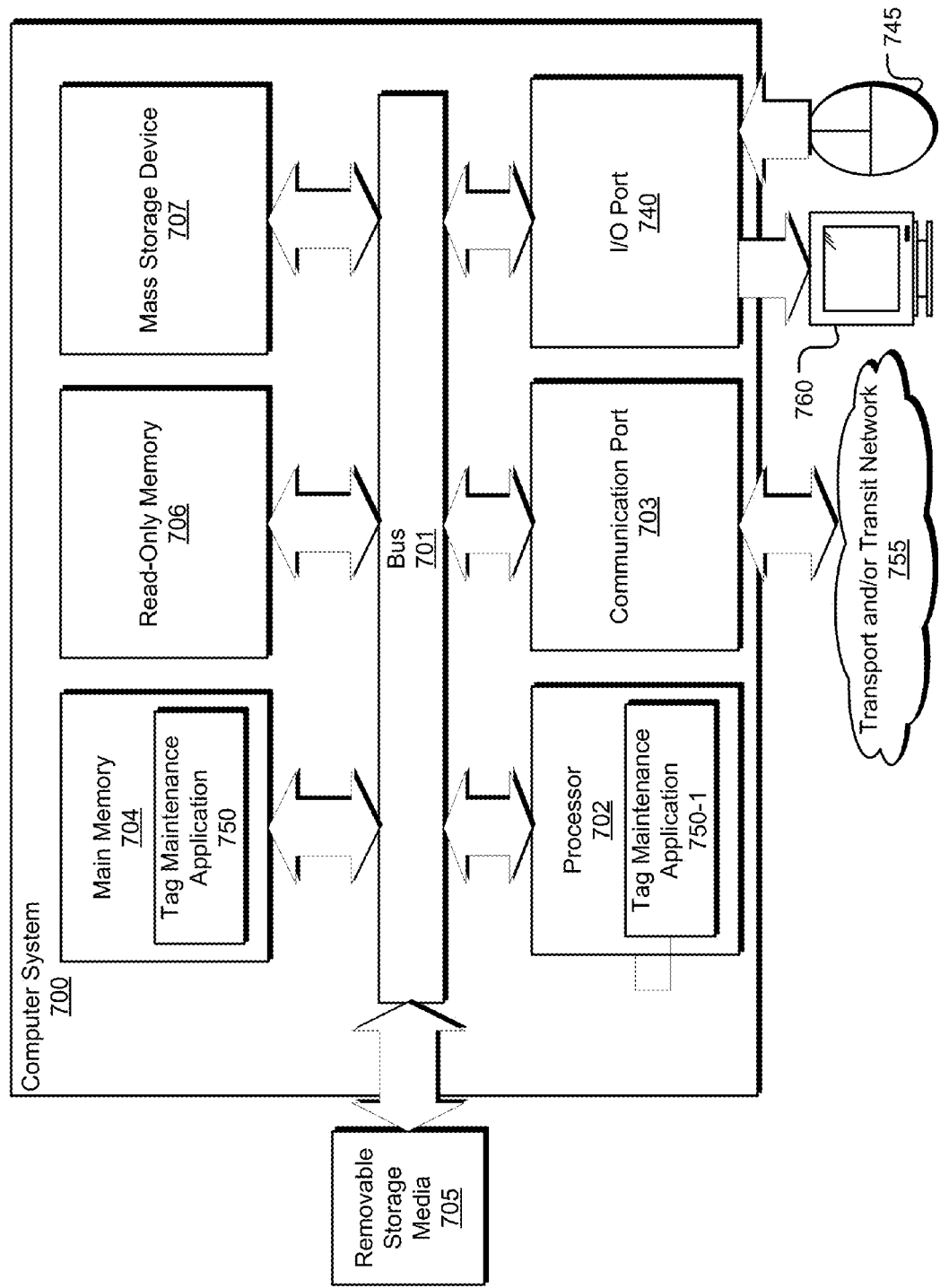
FIG. 7 illustrates an example of a computing system that may implement various services, systems, and methods discussed herein.

FIG. 7 is an example schematic diagram of a computing system 700 that may implement various methodologies discussed herein. For example, the computing system 700 may comprise the application server 140 used to execute one or more software applications and assist with tag creation and maintenance and routing of VoIP calls with host switch 110, or, it may comprise a computing system used by end users to communicate with application server 140 and update geographic information for VoIP lines. The computing system 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer system 200 connects. Computing system may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 may be encoded with a tag maintenance software application 750 that supports functionality as discussed above and as discussed further below. For example, in one embodiment, the tag maintenance software application 750 may include or otherwise implement software functions to create and maintain tags for VoIP lines. Alternatively, where computing system 700 represents an end user system, the software application 750 may comprise a portal for allowing an end user to update geographical location corresponding to a VoIP line. The tag maintenance software application 750 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret or otherwise perform processes, such as through logic instructions, executing on the processor 702 and based on the tag maintenance software application 750 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of call routing for Voice over Internet Protocol (VoIP) calls, comprising:
    utilizing a network service computing device comprising at least one memory for storing instructions that are executed by at least one processor to perform the operations of:
        receiving a first location associated with a first VoIP line, the first VoIP line including a telephone number associated with the first VoIP line;
        creating a first tag associated with the first location, the first tag including geographical information associated with the first location to facilitate routing functionality for calls made from the first VoIP by the geographic information instead of routing calls from the first VoIP line by the telephone number;
        receiving a request to facilitate a VoIP call between the first VoIP line and a second VoIP line;
        routing the VoIP call using the first tag by a host routing device coupled to the network service computing device;
        receiving a second location associated with the first VoIP line;
        creating a second tag associated with the second location; and
        coupling the second tag to the first VoIP line based upon the second location thereby causing calls to be routed from the first VoIP line utilizing the second tag.

2. The method of claim 1, further comprising generating a first billing number associated with the first tag to specify accurate billing of calls made from the first VoIP line.

3. The method of claim 1, further comprising validating the first location to be a known valid address.

4. The method of claim 1, further comprising receiving the first location via a portal, web interface, mobile application, instant messaging application, or Application Programming Interface (API).

5. The method of claim 1, wherein the first location is associated with a first local access and transport area (LATA).

6. The method of claim 1, further comprising receiving a request to update the geographical information associated with the first VoIP line and the first tag.

7. A telecommunications routing system for routing Voice over Internet Protocol (VoIP) calls over a host network, comprising:
    a host routing device; and
    a network service computing device coupled to the host routing device, the network service computing device comprising at least one memory for storing instructions that are executed by at least one processor to:
        receive a first location associated with a first VoIP line;
        create a first tag for the first VoIP line based upon the first location, wherein the host routing device routes calls from the first VoIP line based upon the first tag;
        receive a second location associated with the first VoIP line;
        create a second tag for the first VoIP line based upon the second location; and
        coupling the second tag to the first VoIP line based upon the second location thereby causing calls to be routed from the first VoIP line utilizing the second tag.

8. The system of claim 7, wherein the host routing device includes at least one switch.

9. The system of claim 7, further including a remote network communicably coupled to the host network.

10. The system of claim 9, wherein the first VoIP line is associated with a first communication device of the remote network.

11. The system of claim 7, wherein the first location includes a postal address where the first VoIP line is being utilized.

* * * * *